United States Patent [19]
Tiao et al.

[11] Patent Number: 5,920,667
[45] Date of Patent: Jul. 6, 1999

[54] SWITCH DEVICE FOR OPTICAL FIBERS

[75] Inventors: Kuo-Tung Tiao; Yen-Zen Lee; Wen-Chin Lin; Victor Hwang; Yeh Jin Ching, all of Hsinchu, Taiwan

[73] Assignee: Industrial Technology Research Institute, Hsinchu, Taiwan

[21] Appl. No.: 08/909,759

[22] Filed: Aug. 12, 1997

[51] Int. Cl.$^6$ .................................................. G02B 6/38
[52] U.S. Cl. ................................ 385/22; 385/33; 385/25
[58] Field of Search .............................. 385/16–23, 33, 385/25

[56] References Cited

U.S. PATENT DOCUMENTS

| 5,359,683 | 10/1994 | Pan ............................................ 385/22 |
| 5,420,946 | 5/1995 | Tsai ............................................ 385/22 |
| 5,781,672 | 7/1998 | Cutts ......................................... 385/22 |

Primary Examiner—Hung N. Ngo
Attorney, Agent, or Firm—W. Wayne Liauh

[57] ABSTRACT

A switch device with a spiral mechanism for optical fiber is disclosed for improved reliablility. It includes: (a) a plurality of non-rotatable optical fibers, each having first end and second ends, the first end of each the non-rotatable optical fiber being provided with a parallel convergent lens, the second end of each the non-rotatable optical fiber being provided with a connector to connect an interface for receiving an optical signal; the plurality of the non-rotatable optical fibers being fixed on a circular fixture; (b) a rotatable optical fiber having first and second ends, wherein the first end of the rotatable optical fiber passes through a fixture hole, and connected with connector for receiving a optical signal, while the second end of the rotatable optical fiber being fixed to a motor; and (c) a spiral pipe made of a rigid material being sleeved on a portion of the rotatable optical fiber between the first and second ends The second end of the rotatable optical fiber is arranged such that it can be connected to the first end of one of the non-rotatable optical fibers without contact to form into a coupling channel within an angular scope of 360 degrees.

15 Claims, 8 Drawing Sheets

SWITCH DEVICE FOR OPTICAL FIBERS

BACKGROUND OF THE INVENTION

1. Field of the Invention

The present invention relates to a device for switching optical fibers. More specifically, the present invention relates to a switching device for use with optical fiber which provides improved switching accuracy and without the problem of mechanical distortions.

In the conventional optical fiber switch, a circularity driving and switching method is used. Currently, a commercialized product of such switch has been manufactured by DICON and AOI, etc.

A prior art structure of the optical fiber switch used by DICON and AOI is described with FIG. 1 as follows: A stepping motor can rotate to drive the optical fibers fixed thereon. One end of the optical fiber is connected with a light source through a connector. While the other end of the optical fiber and an end surface of an optical fiber fixed to the fixture are aligned to form into a coupling channel. And the two end surfaces of the two optical fibers are aligned to face a common plane along a central point.

Although the aforesaid optical fiber switch has a high percentage of share so far, it still has some drawbacks. For instance, when the optical fiber fixed to the motor turns at the largest angle, the optical fiber might be damaged or twisted as a result of the mechanical tension. That is the light loss will be increased, or the collimation coupling between two optical fibers will be poor. Such drawbacks will limit the number of optical channels that can be switched. Generally, when the number of optical channels is over 48 channels, the aforesaid drawbacks will emerge. In order to overcome the aforesaid drawbacks of the optical fibers caused by mechanical torsion, the optic-and-mechanical structure must be designed into a two stage in parallel method. This might improve the aforesaid drawbacks, but it will cause more costs on manufacturing the optical channels and the mechanical and electric structure; eventually, it will lost the commercial competitions, such as low cost and simplicity, etc.

U.S. Pat. No. 5,420,946, herein incorporated by reference, describes an optical coupling device which the input fibers is optically aligned with one of a plurality of output fibers via a reflector. The aforesaid reference taught a very different optical coupling switch from the present invention. In the present invention, we use an optical fiber on the fixture to connect to a non-rotatable optical fiber via a rotatable optical fiber. The optical fiber and the supporting stepping motor spindle are optically and mechanically calibrated such what the opposing ends of the non-rotatable and rotatable optical fibers are linearly aligned to allow such optical switching. The reference is totally absent abort the rotatable optical fiber.

In addition to the use of a reflector for light coupling, in the optical coupling device taught by Tsai, GRIN (grade refractive index) lenses—which enlarge the emitted light beam, are used as an aid in aligning the light beams. The light path (as shown in FIG. 7 of Tsai) requires that the distance between the GRIN lens 16 and the reflector 124, and that between the reflector and the output optical fiber 60 be constant. No such constraint is required in the present invention. But more importantly, the present invention provides a totally different mechanism from the Tsai device for optical coupling.

SUMMARY OF THE INVENTION

In view of the drawbacks of the conventional optical fiber switch, the present invention has provided a new optical fiber switch without contact, of which the optical fiber on the motor can turn at angles ranging from 0–360 degrees.

The primary object of the present invention is to provide an optical fiber switching device, with which the optical fiber on the motor can turn at angles ranging from 0–360 degrees without causing the optical fiber to be bent or twisted, as mechanical torsion when turning at the largest angle; in other words. The number of optical fibers to be switched can be increased considerably.

Another object of the present invention is to provide an optical fiber switching device, in which one end $A_1$ of the optical fiber collimator A fixed on the motor and one end $B_3$ of other optical fiber collimator B can form into an optical coupling without contact each other; the other end $A_2$ of the optical fiber collimator A can move together with the motor so as to form into a coupling channel with an end $C_5$ of any one of the optical fibers collimator C fixed on a circular fixture. The other end $B_4$ of the optical fiber collimator B is connected with a light source. It is apparent that when the stepping motor turns, the optical fiber collimator A and the optical fiber collimator C on the fixture will be affected, such as deformation, with the mechanical torsion completely, and then an initial optical fiber switch structure is completed.

Still another object of the present invention is to provide an optical fiber switching device, in which the optical coupling efficiency between the end surface $A_1$ and the end surface $B_3$ of optical fiber collimator and upon the motor rotating can be maintained without causing an eccentric light and the optical fiber to become oblique; otherwise, the efficiency of the coupling channel between the end surface $A_2$ and the end surface $C_5$. In order to maintain a high optical coupling efficiency, the axes of the end surfaces $A_1$ and $B_3$ and the motor spindle must be aligned into a straight line exactly.

A further object of the present invention is to provide an optical fiber switching device, in which the two end surfaces of the two optical fibers and the motor spindle are aligned into a straight line. And by means of the optical coupling without contact, the optical fiber will not be affected with the mechanical torsion.

A still further object of the present invention is to provide an optical fiber switching device, in which a portion between both ends of the optical fiber is sleeved with a spiral pipe so as to cause the optical fiber to be formed into a spiral shape before mounted on the stepping motor; a guide screw rod is inserted into the spiral pipe for fixing the spiral optical fiber in place to reduce the vibration thereof, one end of the spiral optical fiber fixed on the motor passes through a fixture hole to connect with a light source, while other end of the spiral optical fiber can move together with the motor to form into a coupling channel with any one of the optical fibers fixed on the circular fixture at an angle of 360 degrees.

Yet another object of the present invention is to provide an optical fiber switching device, which can overcome the problem of the optical fiber becoming deformed as a result of the mechanical torsion acting on the motor when it rotates. In order to minimize such mechanical torsion when switching the optical fibers, the optical fiber is formed into a spiral shape, and also the length thereof is increased, i.e., to increase the number of turns N of the spiral optical fiber or to increase the total length L thereof so as to reduce the effect of an external force or a mechanical torsion added to a given unit length of the optical fiber.

Yet still another object of the present invention is to provide an optical fiber switching device, which can overcome the problems of the inconsistence of turning left and right of the spiral fiber, and the prolonged switching time of the optical fibers. In order to overcome the aforesaid problems, (1) the spiral pipe must be made of a rigid material so as to prevent a the return effect observed from a soft material, which would cause a longer switching time and a poor collimation coupling; (2) a screw rod is used for reducing the vibration of the optical fiber. The vibration would cause a poor collimation coupling and a longer switching time. Further, the upper half portion of the optical fiber must a bare fiber above the guide screw rod so as to prevent the optical fiber from bending and deformation upon switching.

DESCRIPTION OF THE PREFERRED EMBODIMENT

Figure 1:
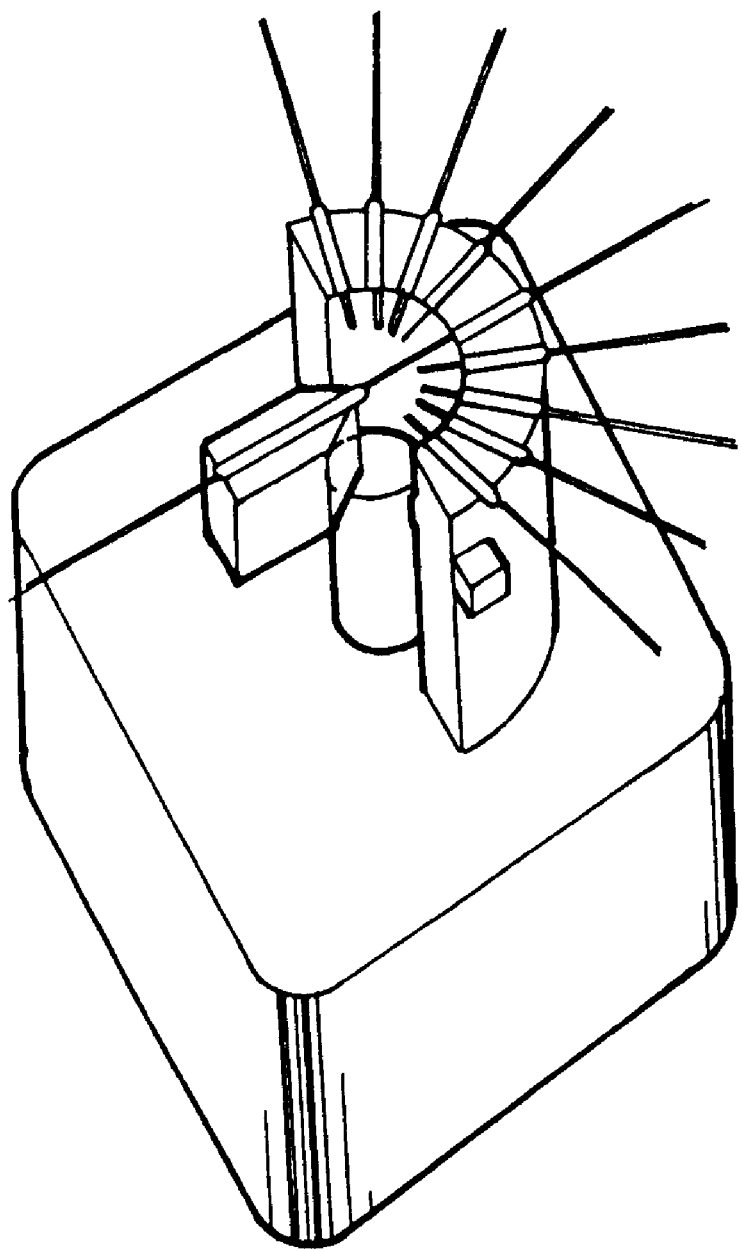
FIG. 1 is a perspective view of a conventional fiber optic switch.
Figure 2:
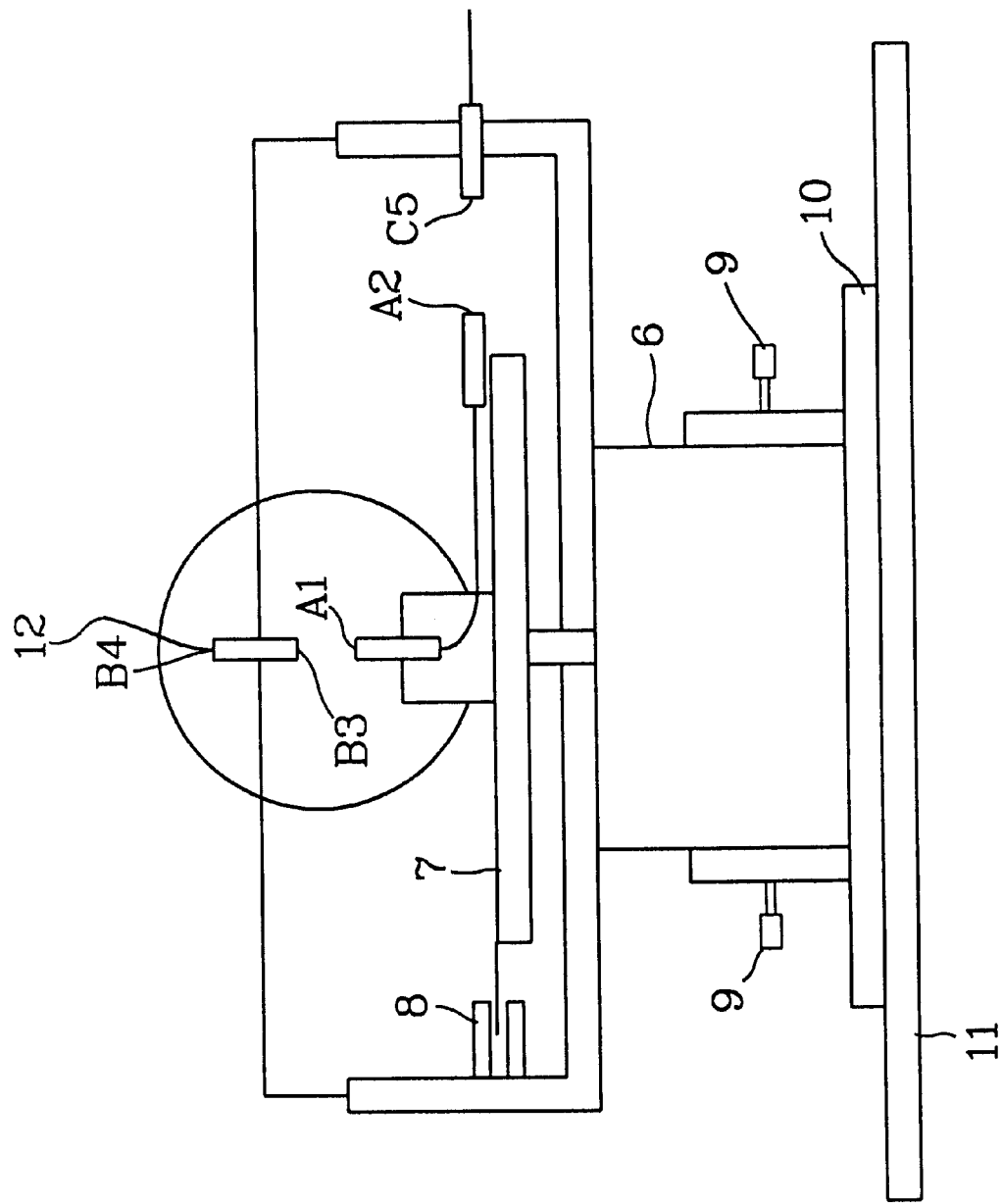
FIG. 2 is a sectional view of an embodiment-1 of a switch device for optical fibers according to the present invention.
Figure 3:
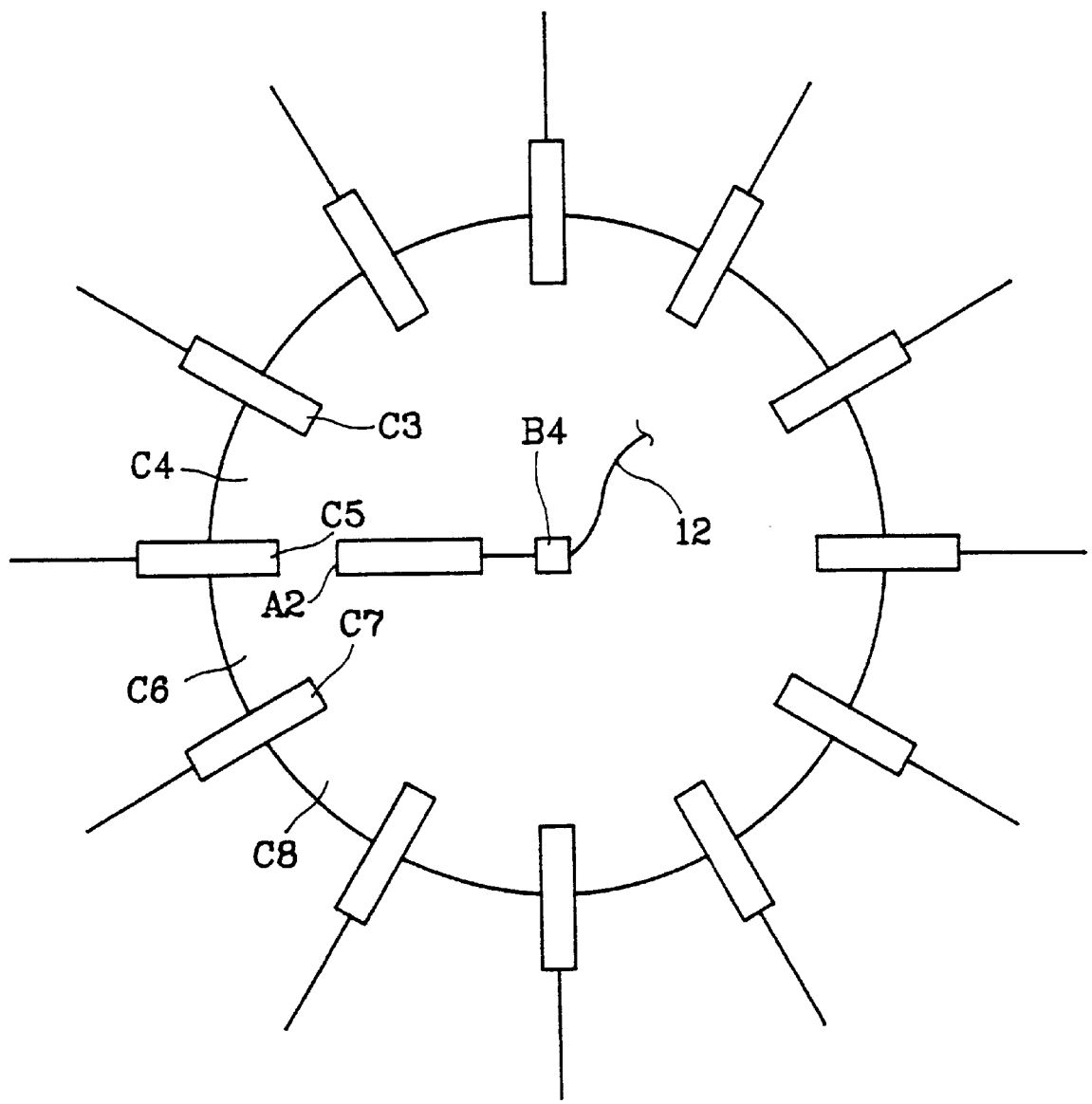
FIG. 3 is a top view of the embodiment-1 according to the present invention.

FIG. 2 is a sectional view of an embodiment-1 of a switching device for optical fibers according to the present invention, which comprises three collimators A, B and C of optical fibers, a plurality of end surfaces $A_1$, $A_2$, $B_3$, $B_4$ and $C_5$, a stepping motor 6, a supporting rack 7, a shielding member 8, screws 9, a turntable 10, a flat rack 11 and a stepping motor spindle 38. The end surface $C_5$ of collimator C is provided with a parallel convergent lens, of which another end having a connector for receiving an optical signal. The end surfaces $A_1$, $A_2$ and $B_3$ are provided with a parallel convergent len respectively. The end surface $B_4$ of collimator B has a connector to connect a light receiver for receiving an optical signal. First, the stepping motor 6 is fixedly mounted on the turntable 10 by means of screws 9 on both sides of the turntable 10, which is substantially mounted on the flat rack 11. The stepping motor 6 is mounted with an collimator A, of which one end surface $A_1$ and one end surface $B_3$ of an collimator B are set in optical coupling without contact. The other end surface $B_4$ of the collimator B is connected with a light source 12. The other end surface $A_2$ of the collimator A is set at angle of 90 degrees or a given angle with the end surface $A_1$, and the end surface $A_2$ can be turned by means of the stepping motor to become optical coupling with one end surface $C_5$ of an collimator C fixed on the circular fixture. After the end surfaces $A_2$ and $C_5$ are formed into a coupling channel, such optical switch is deemed in "ON" condition; if not, the two end surfaces $A_2$ and $C_5$ are in "OFF" condition. An optical switch made of such coupling method can prevent the optical fibers from being twisted by a mechanical force upon the stepping motor rotating; a twisted optical fiber would cause a consumption to light rays and a poor collimation coupling.

Figure 4:
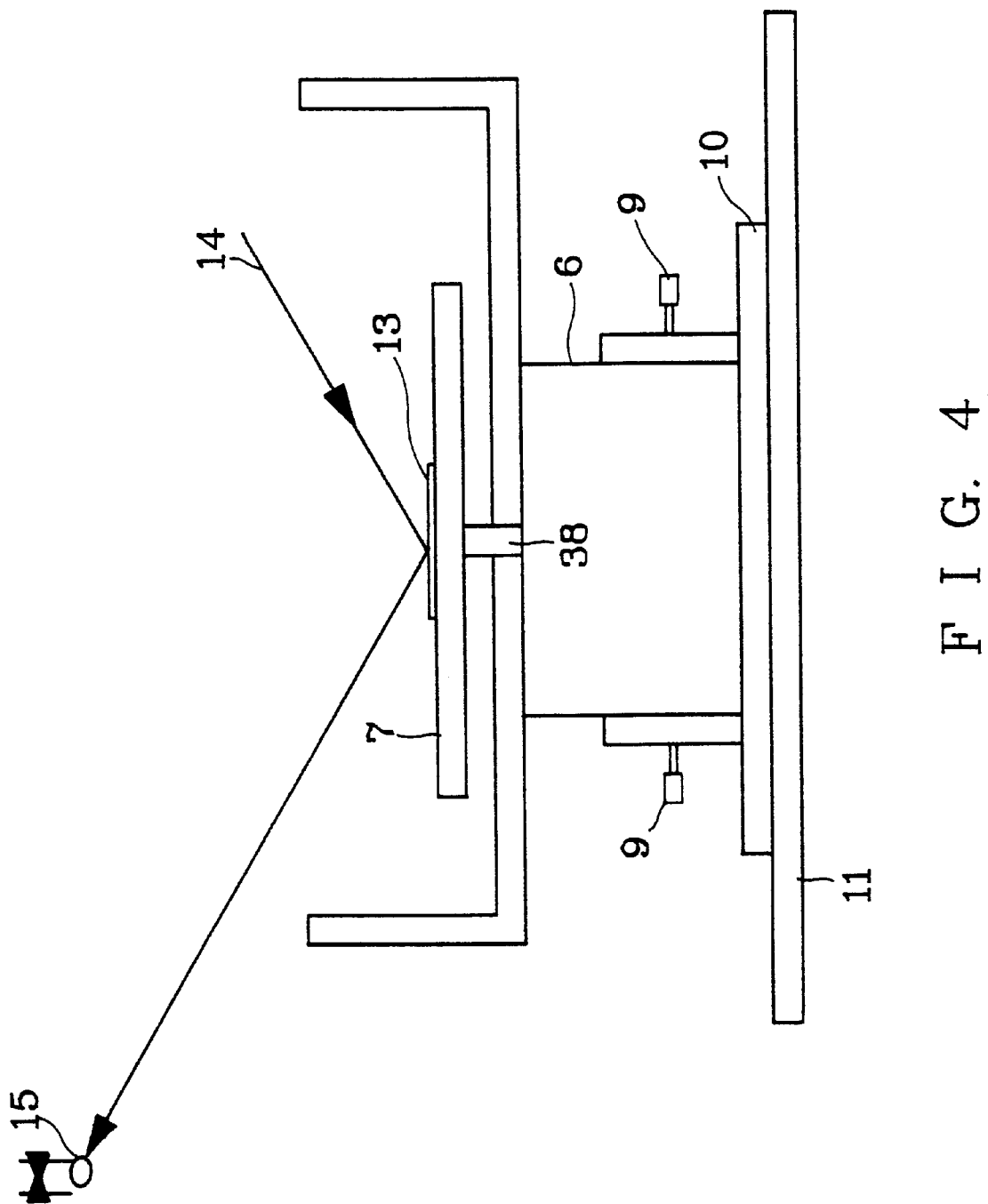
FIG. 4, 5, 6 and 7 illustrate the manufacturing and assembling steps of the embodiment-1 of an optic-and-mechanical technique according to the present invention.

Since the two end surfaces $A_1$ and $A_2$ of the collimator A are set at a right angle or a given angle, the end surface $A_2$ can form into a coupling channel with the collimator C on the fixture only when they are set in parallel condition. For instance, the end surface $A_2$ and the end surface $C_5$ can form into a coupling channel upon being aligned in parallel. If the stepping motor drives the end surface $A_2$ to point the position $C_6$, they will be unable to form into a coupling channel. As shown in FIG. 4, before the end surface $A_2$ of the collimator A having a steady lumens and forming into a good coupling channel with the collimator C, the end surface $A_1$ of the collimator A has to have a high optical coupling with the end surface $B_3$ of the collimator B upon the stepping motor rotating.

In the embodiment-1 of the present invention, the first key step is to control the stepping motor, during rotating, to provide a high optical coupling between the end surface $A_1$ and the end surface $B_3$, i.e., without eccentric and oblique problems. In order to satisfy such requirements, the axis of the stepping motor 6 during rotating must be always aligned with the optical axes of the end surfaces $A_1$ and $B_3$, therefore, the present invention has provided an optic-and-mechanical calibration technique as the keys steps thereof so as to elevate the optical coupling result.

Referring to FIG. 4, it illustrates the step-1 includes parts of the stepping motor 6, the screws 9, the turntable 10, the flat rack 11, the reflector 13, a visible laser light 14 and a screen 15. First, an adjustable reflector 13 is mounted on the motor spindle; a helium-and-neon laser light 14 is projected on to a screen 15 (over five meters away) through a reflector. During the motor rotating, adjust the oblique degrees of the reflector to have the spot light projected on to the screen 15 had a minimum displacement so as to maintain the reflector plane at a right angle with respect to the motor spindle 38 exactly.

Figure 5:
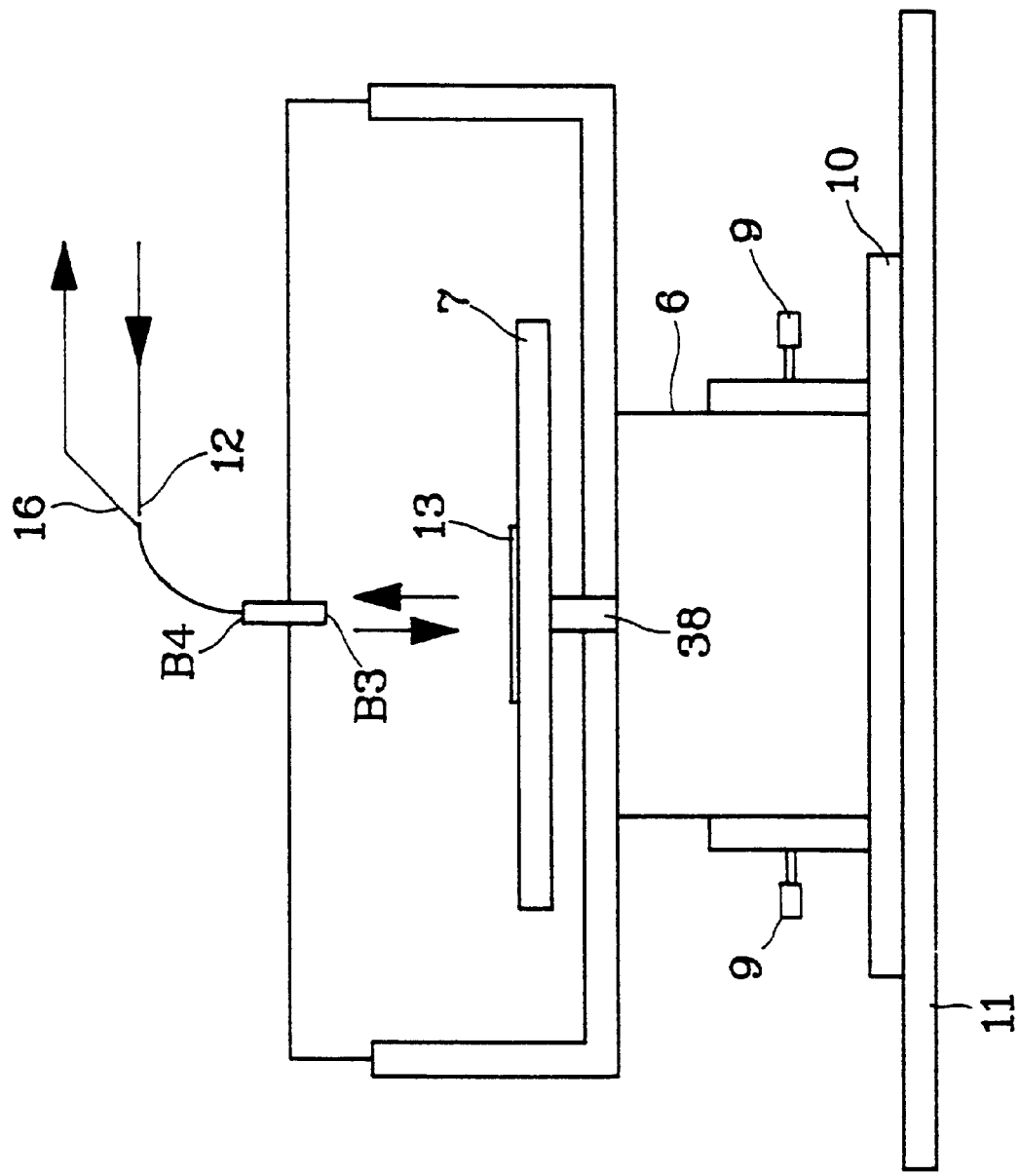

Referring to FIG. 5, it illustrates the step-2 to calibrate and set the optical fiber collimator and the motor spindle 38 in parallel condition; the step-2 includes parts of the stepping motor 6, the screws 9, the turntable 10, the flat rack 11, a light source 12, the reflector 13 and a light receiver 16. After the step-1 is completed, the reflector 13 and the stepping motor spindle 38 will be set at a right angle each other; then, the end surface $B_3$ of the collimator B will be set perpendicular to the reflector 13, and then the reflected light from the reflector 13 will be received with one end surface $B_3$ of the optical fiber B; the light received will be transmitted to an optical gage through a light coupler. As soon as the end surface $B_3$ of the optical fiber collimator is adjusted to become perpendicular to the reflector 13, the optical gage will have maximum lumens Pmax; by using such method, the axis of reflector plane and the stepping motor spindle 38 can surely be maintained in parallel condition.

Figure 6:
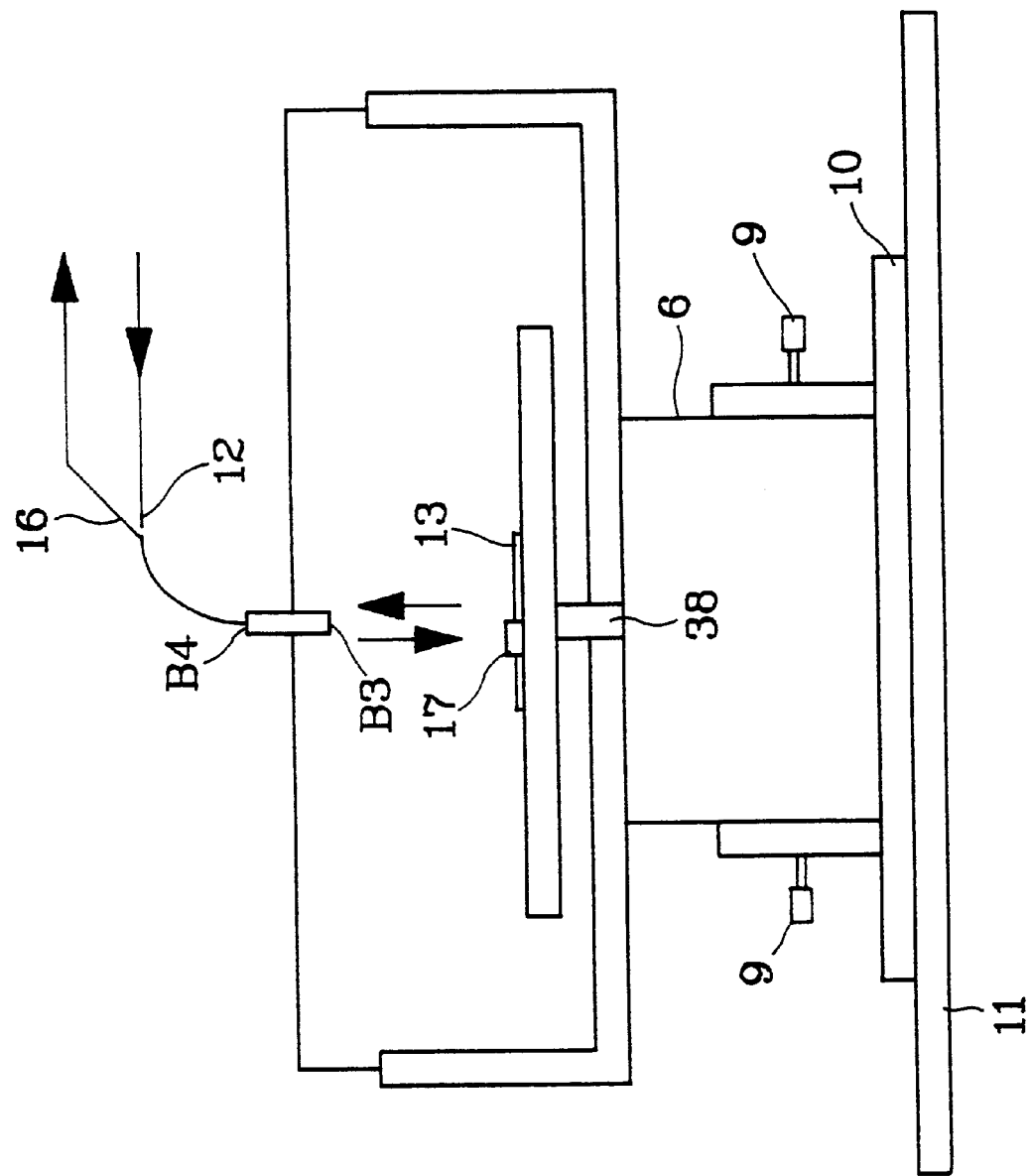

Referring to FIG. 6, it illustrates the step-3 to calibrate and align the optical fiber collimator, the light axis and the stepping motor spindle 38 into a straight line. The step-3 includes parts of the stepping motor 6, screws 9, the turntable 10, the flat rack 11, the light source 12, the reflector 13, the light receiver 16 and the shutter 17. After the step-1 and step-2, put a shutter 17 to have the lumens reduced below the maximum lumens reduced below the maximum lumens Pmax, and then let the motor 6 rotate; when the motor rotates, the reflector plane will turn at different angles, and it will receive different lumens. Use the reflector surface as a reference plane, and then adjust the corresponding horizontal position between the end surface $B_3$ of the optical fiber and the motor spindle 38 so as to obtain a constant value of lumens upon the motor rotating; by means of such method, the axis of the collimator B and the motor spindle 38 can be aligned into a straight line exactly.

Figure 7:
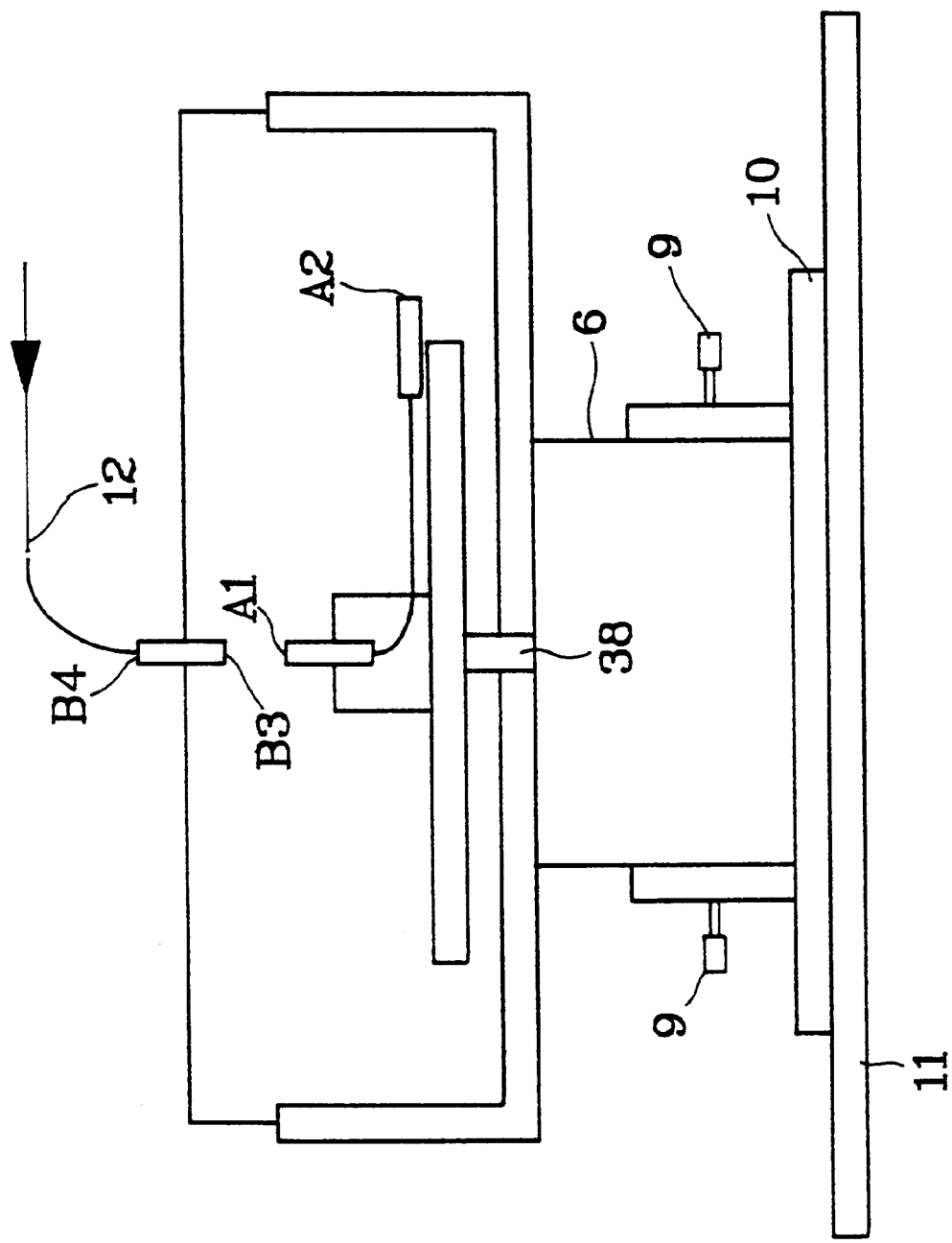

Referring to FIG. 7, it illustrates the step-4 to calibrate and align the axis of the optical fiber A and the motor spindle 38 into a straight line; the step-4 includes the optical fiber collimators A and B, the stepping motor 6, screws 9, the turntable 10, the flat rack 11, and the light source 12. After the step-1, step-2 and step-3, have the end surface $A_1$ of the optical fiber collimator A and the end surface $B_3$ of the optical fiber collimator B set under the best coupling condition so as to let the end surface $A_2$ of the optical fiber collimator A have the maximum output of lumens. The end surface $A_1$ of the optical fiber collimator A is fixedly mounted to the motor spindle; then, the axis of the end surface $A_1$ of the optical fiber collimator A, the axis of the end surface $B_3$ of the optical fiber collimator B, and the stepping motor spindle 38 have been aligned into a straight line. When the motor rotates, the light coupling result between the optical fiber collimators A and B will be maintained constantly.

Figure 8:
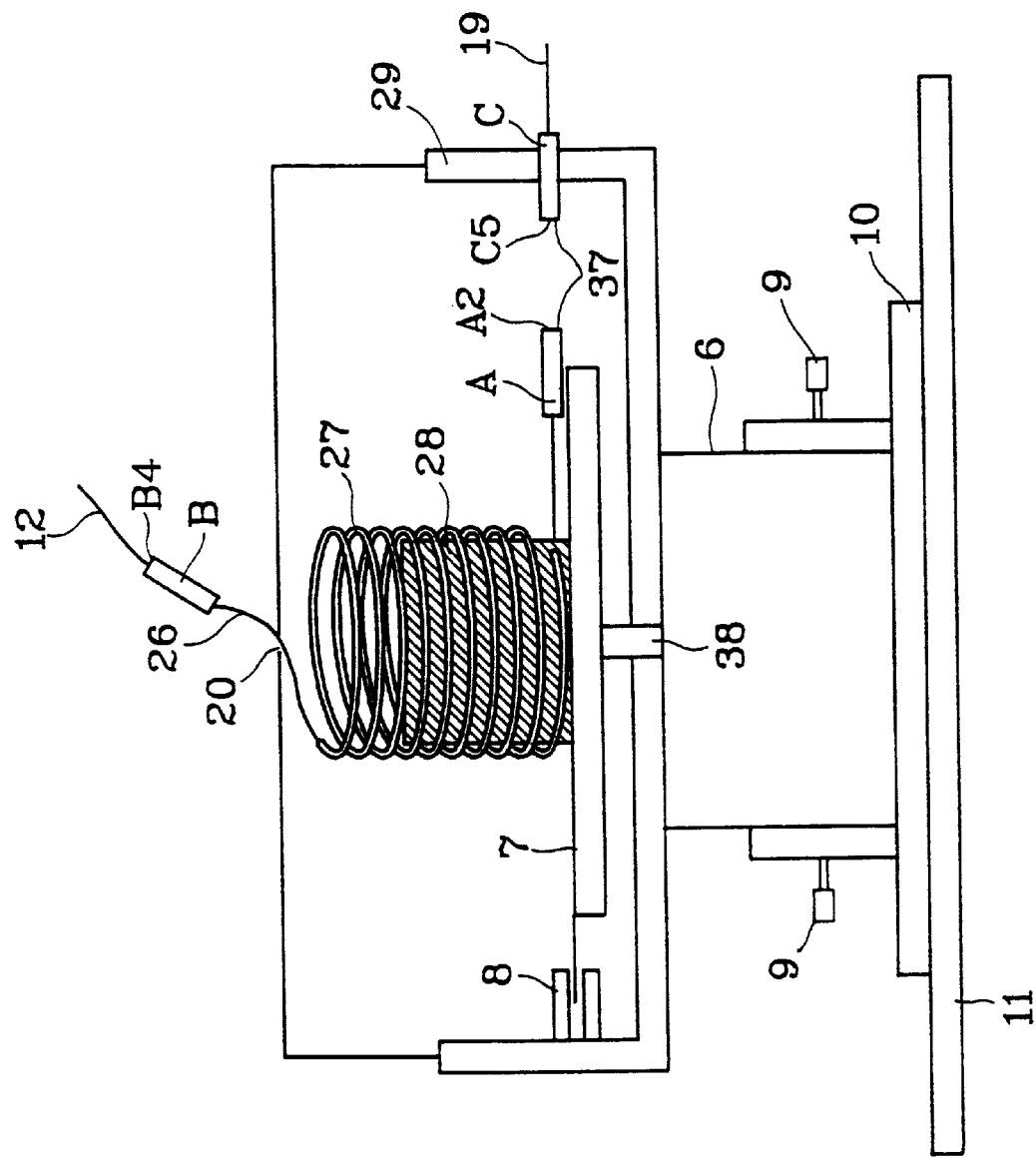
FIG. 8 is a sectional view of embodiment-2 for a switch device for optical fibers according to the present invention.

FIG. 8 illustrates an embodiment-2 of a switch device for optical fibers according to the present invention, which comprises at least two optical fiber collimators A, B and C, at least three end surfaces $A_2$, $B_4$ and $C_5$, an optical fiber 26, a spiral pipe 27, a guide screw rod 28, a fixture 29, a fixture hole 20, a shielding member 8, a supporting rack 7, a stepping motor 6, screws 9, a turntable 10, a flat rack 11, a parallel convergent lens 37, stepping motor spindle 38, a light source 12 and an interface 19. The stepping motor 6 is fixedly mounted on the turntable 10 by using two screws 9 on both sides of the turntable 10; the turntable 10 is mounted on the flat rack 11. A spiral optical fiber 26 is mounted on the stepping motor 6; the spiral optical fiber 26 is covered with the spiral pipe 27 made of a rigid material. In order to minimize the vibration of the spiral optical fiber, a guide screw rod 28 is mounted inside the spiral pipe 27 so as to fix the optical fiber 26 in place. In order to minimize the twist of the optical fiber upon the stepping motor rotating, a portion of the optical fiber is not attached to the guide screw rod 28; one end $B_4$ of the collimator B of the optical fiber 26 passed through a fixture hole 20 of the fixture 29 to connect directly with an outer light source 12, while the other end $A_2$ of the collimator A of the optical fiber 26 can move along a circle upon the motor rotating so as to couple with or to form into a coupling channel with an end surface $C_5$ of any one optical fiber collimator C fixed on the fixture 29. As soon as the end surfaces $A_2$ and $C_5$ of the optical fiber collimators are formed into a coupling channel, the switch is turned on; if they are not forming into a coupling channel, the switch is turned off. The optical fiber switch with the aforesaid spiral and buffer mechanism can have more turns N of the spiral optical fiber or longer optical fiber in terms of length L as a result of (1) the spiral optical fiber 26, and (2) a sufficient length of the optical fiber; the object of such mechanism is to reduce a given unit of length of the optical fiber to be affected by outer force or mechanical force so as to avoid any limit caused by the switching angle; (3) the optical fiber is sleeved with a spiral pipe 27 made of a rigid material so as to increase the repeating effect of the optical fiber switch, and to increase the consistence upon turning leftwards or rightwards, and to shorten the switching time; (4) the optical fiber attached to the guide screw rod 27 will reduce vibration of the optical fiber upon switching. The switch device furnished with the spiral mechanism is able to turn at an angle of 360 degrees so as to prevent the optical fiber from being affected by an outer force or a mechanical force to the minimum.

We claim:
1. A switch device for optical fibers, comprising:
(a) a first non-rotatable optical fibers, said first non-rotatable optical fiber being provided with a collimator, said first end of said collimator of said first non-rotatable optical fiber being provided with a parallel convergent lens, while said second end of said collimator of said first non-rotatable optical fiber having a connector for receiving an optical signal input; said collimators of first non-rotatable optical fibers being mounted on a fixture;
(b) a plurality of second non-rotatable optical fibers, said end of each said second non-rotatable optical fiber being provided with a collimator being mounted on the circular fixture, said first end of said collimator of each said second non-rotatable optical fiber being provided with a parallel convergent lens, while said second of said collimator of each said second non-rotatable optical fiber having a connector to correct an interface for receiving an optical signal output; and
(c) a rotatable optical fiber fixedly mounted on said stepping motor spindle and having first end and second end; said first and second ends of said rotatable optical fiber being arranged in a non-straight line angular relationships; said first end of said rotatable optical fiber receiving an optical signal though a parallel convergent lens, while said second end thereof being mounted with a parallel convergent lens; where in the axis of said first end of said rotatable optical fiber is aligned in a straight line relationship with said stepping motor spindle via a first optic-and mechanical calibration technique and the axis of said second end thereof is aligned in a straight line relationship with said parallel convergent lens of said one of second non-rotatable optical fibers;
(d) further wherein said second end of said rotatable optical fiber is arranged such that it can be connected to of said first or second non-rotatable optical fibers without contact.

2. A switch device for optical fibers as claimed in claim 1, wherein said rotatable optical fiber is driven to rotate with said stepping motor; said stepping motor connected with a control systems, in which a specific discrete identical steps being put in first so as to control said motor to rotate regularly, and then said rotatable optical fiber on said motor and said first non-rotatable optical fibers on said fixture able to provide a best optical coupling without contact.

3. A switch device for optical fibers as claimed in claim 1, wherein said precise optic-and-mechanical calibration technique is used for setting a reflector on said motor which reflector surface is perpendicular to said motor spindle; a laser light being projected to said reflector, which projecting said light to a screen placed away so as to adjust oblique degrees of said reflector upon said motor rotating so as to have a projected spot light has a minimum displacement.

4. A switch device for optical fibers as claimed in claim 1, wherein said second end of said first non-rotatable optical fiber being provided with a connector to connect a light receiver for receiving the reflect light from said reflector.

5. A switch device for optical fibers as claimed in claim 1, wherein said first and second ends of said rotatable optical fiber being provided with a collimator, respectively.

6. A switch device for optical fibers as claimed in claim 4, wherein said first end of said collimator of first non-rotatable optical fiber is connected with an input light source though a connector, said second end being provided with a parallel convergent lens.

7. A switch device for optical fibers as claimed in claim 3 wherein said precise optic-and-mechanical calibration technique comprises the steps of:
(a) causing said collimator of first non-rotatable optical fiber become perpendicular to said reflector plane; and (b) adjusting first end surface of said first non-rotatable optical fiber until the axis thereof becomes perpendicular to said reflector plane, said calibration method is completed when a maximum lumens being shown on said light receiver to indicate that said axis thereof becoming perpendicular to said reflector plane exactly.

8. A switch device for optical fibers as claimed in claim 1, wherein said precise optic-and-mechanical calibration technique is used for aligned said axis of collimator of said first non-rotatable optical fiber and said motor spindle into a straight line by using a shutter placed on said reflector and driving said motor to rotate so as to adjust said end surface of said collimator of first non-rotatable optical fiber and to let said light receiver receive a constant lumen value.

9. A switch device for optical fibers as claimed in claim 1, or 8, wherein said precise optic-and-mechanical calibration technique is used for aligning said first non-rotatable optical fiber and said motor spindle into a straight line so as to have said first end of first non-rotatable optical fiber and said first end of rotatable optical fiber on said motor had a best optical coupling, and to provide a maximum lumen output on second end of said rotatable optical fiber, and said maximum lumen output able to be obtained by said first end of said second non-rotatable optical fiber.

10. A switch device for optical fibers as claimed in claim 1, wherein said second non-rotatable optical fiber mounted in specific positions on said circular fixture are arranged at an angle of 360 degrees; said second end of said rotatable optical fiber driven with said motor able to have a best optical coupling without contact with any one said first end of said second non-rotatable optical fiber on said circle at an angle of 360 degrees.

11. A switch device with a spiral mechanism for optical fiber, comprising:

(a) a plurality of non-rotatable optical fibers, each having first end and second ends, said first end of each said non-rotatable optical fiber being provided with a parallel convergent lens, said second end of each said non-rotatable optical fiber being provided with a connector to connect an interface for receiving an optical signal; said plurality of said non-rotatable optical fibers being fixed on a circular fixture;

(b) a rotatable optical fiber having first and second ends, wherein said first end of said rotatable optical fiber passes through a fixture hole, and connected with connector for receiving a optical signal, while said second end of said rotatable optical fiber being fixed to a motor; and (c) a spiral pipe made of a rigid material being sleeved on a portion of said rotatable optical fiber between said first and second ends;

(d) wherein said second end of said rotatable optical fiber is arranged such that it can be connected to said first end of one of said non-rotatable optical fibers without contact to form into a coupling channel within an angular scope of 360 degrees.

12. A switch device for optical fibers as claimed in claim 11, wherein said non-rotatable optical fibers mounted on said fixture within an angle scope of 360 degrees; said stepping motor driving said second end of said rotatable optical fiber to form an optical coupling without contact with any one of said first end of said non-rotatable optical fibers.

13. A switch device for optical fibers as claimed in claim 11, wherein a portion of said optical fiber between said first end and second end is sleeved with a spiral pipe to have said rotatable optical fiber formed into a spiral shape.

14. A switch device for optical fibers as claimed in claim 11, wherein said portion of said rotatable optical fiber between said first end and said second end is sleeved with a guide screw rod made of a rigid material.

15. A switch device for optical fibers as claimed in claim 11, wherein said rotatable optical fiber in said spiral pipe is inserted with a guide screw rod, and a portion of said rotatable optical fiber nearing said first end is a bare fiber outside said guide screw rod.

* * * * *